US011174188B2

(12) United States Patent
Palmantier et al.

(10) Patent No.: US 11,174,188 B2
(45) Date of Patent: Nov. 16, 2021

(54) BENDING OF SHEETS OF GLASS

(71) Applicant: SAINT-GOBAIN GLASS FRANCE, Courbevoie (FR)

(72) Inventors: Arthur Palmantier, Aachen (DE); Emilien David, Vern sur Seiche (FR); Jack Penners, Herzogenrath (DE); Herbert Radermacher, Raeren (BE); Werner Kahlen, Herzogenrath (DE); Achim Zeichner, Herzogenrath (DE); Peter Schillings, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 288 days.

(21) Appl. No.: 16/093,416

(22) PCT Filed: Apr. 5, 2017

(86) PCT No.: PCT/FR2017/050813
§ 371 (c)(1),
(2) Date: Oct. 12, 2018

(87) PCT Pub. No.: WO2017/178733
PCT Pub. Date: Oct. 19, 2017

(65) Prior Publication Data
US 2019/0127260 A1 May 2, 2019

(30) Foreign Application Priority Data

Apr. 13, 2016 (FR) .................................. 1653251
Jul. 25, 2016 (FR) .................................. 1657135
Jul. 25, 2016 (FR) .................................. 1657136

(51) Int. Cl.
*C03B 23/03* (2006.01)
*C03B 35/14* (2006.01)
(Continued)

(52) U.S. Cl.
CPC .......... *C03B 23/03* (2013.01); *C03B 23/0252* (2013.01); *C03B 23/0357* (2013.01);
(Continued)

(58) Field of Classification Search
CPC ........................ C03B 2225/02; C03B 23/0357
See application file for complete search history.

(56) References Cited

U.S. PATENT DOCUMENTS 4,437,872 A * 3/1984 McMaster ........... C03B 23/0252
65/104
4,596,592 A * 6/1986 Frank .................. C03B 23/0302
65/106
(Continued)

FOREIGN PATENT DOCUMENTS

CN 1533365 A 9/2004
EP 0 255 422 A1 2/1988
(Continued)

OTHER PUBLICATIONS

International Search Report as issued in International Patent Application No. PCT/FR2017/050813, dated Jul. 13, 2017.
(Continued)

*Primary Examiner* — Erin Snelting
(74) *Attorney, Agent, or Firm* — Pilsbury Winthrop Shaw Pittman LLP

(57) ABSTRACT

The invention relates to a device for bending sheets of glass, comprising an upper bending form and a bending support, the upper bending form and/or the bending support being laterally mobile relative to one another, the bending support comprising a pre-bending mold for the gravity bending of a sheet of glass and a press-bending mold configured for pressing the sheet of glass against the upper form, of these two molds of the bending support one being surrounded by the other when viewed from above, at least one of these two (Continued)

molds of the bending support being able to be given a relative vertical movement with respect to the other.

33 Claims, 9 Drawing Sheets

(51) Int. Cl.
  *C03B 23/025* (2006.01)
  *C03B 23/035* (2006.01)
  *C03B 35/16* (2006.01)
  *C03B 40/00* (2006.01)
(52) U.S. Cl.
  CPC ............ *C03B 35/145* (2013.01); *C03B 35/16* (2013.01); *C03B 35/161* (2013.01); *C03B 40/005* (2013.01); *C03B 2225/02* (2013.01)

(56) References Cited

U.S. PATENT DOCUMENTS

| | | | | |
|---|---|---|---|---|
| 4,682,997 | A * | 7/1987 | Halberschmidt | C03B 23/035 65/104 |
| 4,764,196 | A * | 8/1988 | Boutier | C03B 23/0352 65/106 |
| 5,167,689 | A * | 12/1992 | Weber | C03B 23/027 65/106 |
| 5,340,375 | A * | 8/1994 | Anttonen | C03B 23/0252 65/104 |
| 5,472,470 | A * | 12/1995 | Kormanyos | C03B 23/03 65/287 |
| 5,597,397 | A * | 1/1997 | Funk | C03B 23/03 65/171 |
| 5,660,609 | A * | 8/1997 | Muller | C03B 23/027 65/107 |
| 5,679,124 | A | 10/1997 | Schnabel, Jr. et al. | |
| 5,865,866 | A | 2/1999 | Schnabel, Jr. et al. | |
| 5,906,668 | A | 5/1999 | Mumford et al. | |
| 6,015,619 | A | 1/2000 | Schnabel, Jr. et al. | |
| 6,574,992 | B1 | 6/2003 | Kuster et al. | |
| 9,452,948 | B2 | 9/2016 | Nitschke et al. | |
| 2004/0107729 | A1 * | 6/2004 | Fukami | C03B 23/0305 65/25.4 |
| 2005/0061034 | A1 | 3/2005 | Boisselle et al. | |
| 2007/0157671 | A1 * | 7/2007 | Thellier | C03B 23/0252 65/106 |
| 2008/0134722 | A1 * | 6/2008 | Balduin | C03B 23/0357 65/106 |
| 2008/0307830 | A1 | 12/2008 | Vild et al. | |
| 2009/0084138 | A1 | 4/2009 | Imaichi et al. | |
| 2009/0320523 | A1 | 12/2009 | Fukami et al. | |
| 2010/0236290 | A1 * | 9/2010 | Fukami | C03B 23/027 65/106 |
| 2013/0042650 | A1 * | 2/2013 | Thellier | C03B 23/0352 65/106 |
| 2015/0218029 | A1 * | 8/2015 | Nitschke | C03B 23/0252 65/25.4 |

FOREIGN PATENT DOCUMENTS

| | | |
|---|---|---|
| EP | 0 448 447 A1 | 9/1991 |
| EP | 0 705 798 A1 | 4/1996 |
| EP | 1 484 290 B1 | 9/2010 |
| EP | 2 233 444 A1 | 9/2010 |
| EP | 3 102 546 A1 | 12/2016 |
| JP | H07-267663 A | 10/1995 |
| JP | 2000-327355 A | 11/2000 |
| JP | 2003-335533 A | 11/2003 |
| JP | 2009-512617 A | 3/2009 |
| WO | WO 95/32924 A1 | 12/1995 |
| WO | WO 2004/087590 A2 | 10/2004 |
| WO | WO 2006/072721 A1 | 7/2006 |
| WO | WO 2008/075694 A1 | 6/2008 |
| WO | WO 2009/072530 A1 | 6/2009 |
| WO | WO 2011/144865 A1 | 11/2011 |
| WO | WO 2015/119752 A1 | 8/2015 |

OTHER PUBLICATIONS

Notice of Reasons for Refusal as issued in Japanese Patent Application No. 2018-553911, dated Jan. 26, 2021.

* cited by examiner

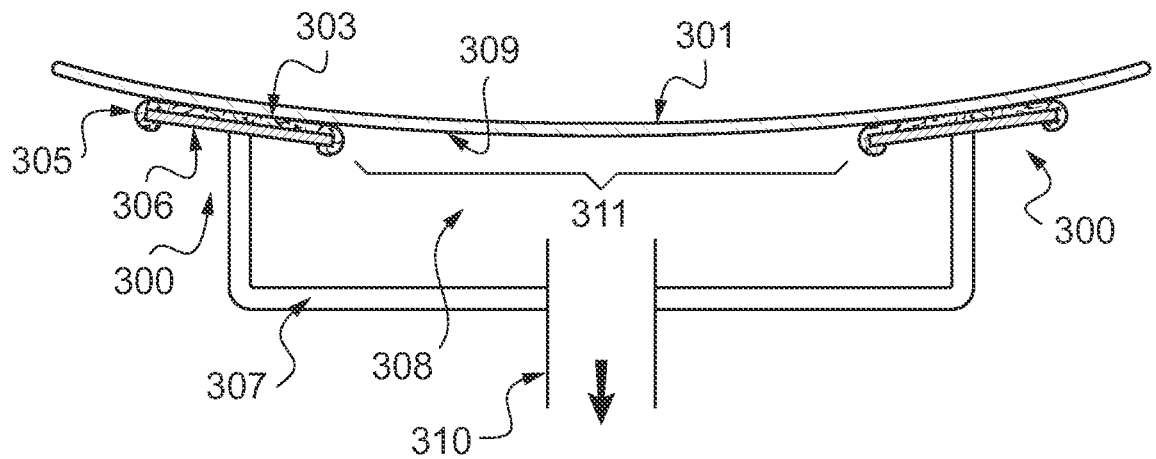
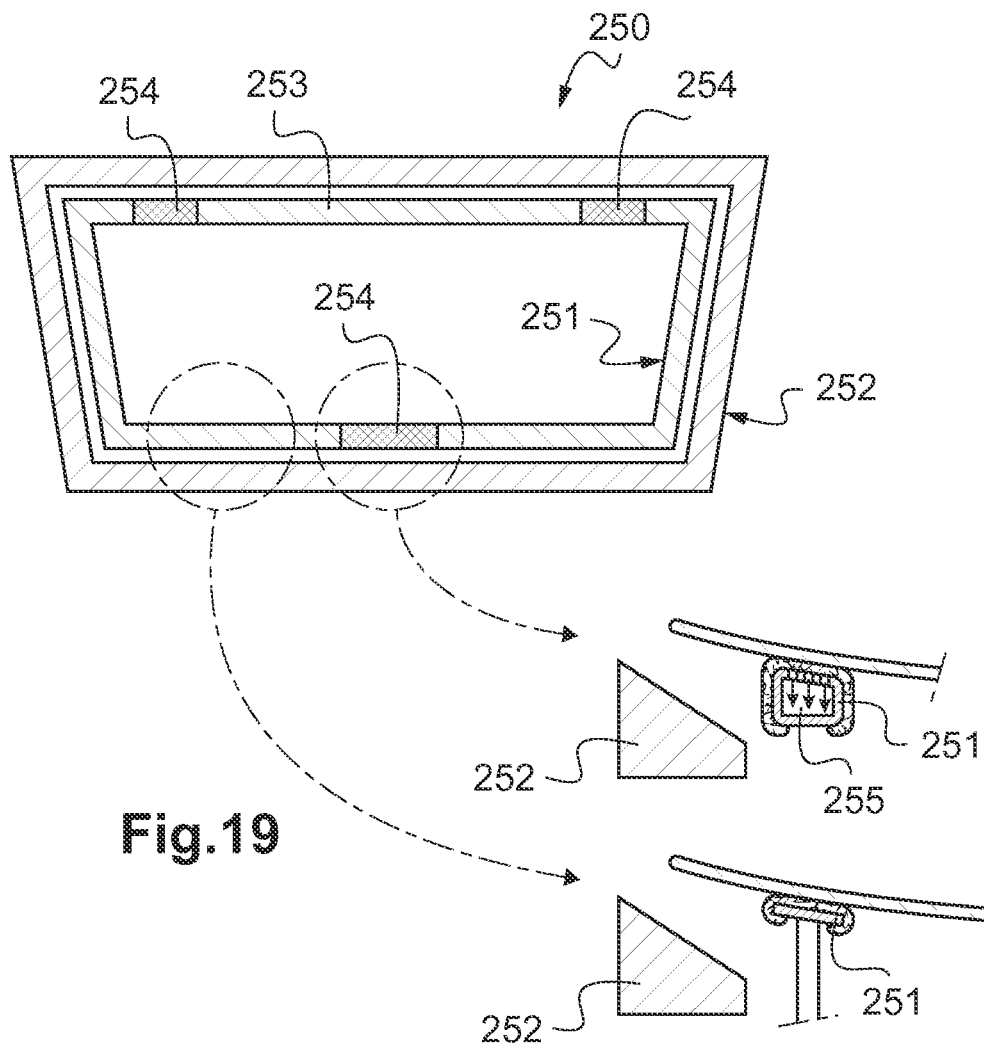

BENDING OF SHEETS OF GLASS

CROSS-REFERENCE TO RELATED APPLICATIONS

This application is the U.S. National Stage of PCT/FR2017/050813, filed Apr. 5, 2017, which in turn claims priority to French patent application number 1653251 filed Apr. 13, 2016, French patent application number 1657135 filed Jul. 25, 2016 and French patent application number 1657136 filed Jul. 25, 2016. The content of these applications are incorporated herein by reference in their entireties.

The invention relates to a device and an industrial method for bending sheets of glass.

Numerous bending methods are known. According to EP448447 or EP0705798, sheets of glass are gravity bent on double frames, the glass passing from a pre-bending frame to a finish-bending frame by the retraction of one frame in relation to the other. The use of this type of device allows progressive bending to be applied and makes it possible to avoid the phenomenon of reverse-bending in the corners of the sheet. According to certain methods like described in WO2004/087590 or WO2006072721, the glass is first of all gravity bent on a bending frame, then press-bent against an upper bending form or a lower bending form. These methods entail the creation of a multitude of gravity-bending supports passing one after another as a sequence of supports. According to EP255422, a sheet of glass is bent by blowing upward against an upper bending form. U.S. Pat. No. 5,906,668 may also be cited.

According to the present invention, a highly compact and rapid device has been designed to make it possible to bend sheets of glass one after another, using the time taken to transfer between a position of off-loading from a conveying means and a press-bending workstation to achieve gravity bending, with a sheet of glass that is to be bent passing near-instantaneously from a gravity-bending support (referred to as a pre-bending mold) to a press-bending mold. In order to achieve this, a bending support has been devised that combines a pre-bending mold on which the sheet begins to be bent (or "pre-bent" to use an expression that means that this is a bending that is partial in comparison with the final bent shape), and a press-bending mold, these two elements being intimately close to one another given that one is inside the other, when viewed from above. The passage of the sheet of glass from the pre-bending mold to the press-bending mold being accomplished through a simple relative vertical movement of one with respect to the other. The press-bending mold is intended to press a sheet of glass against an upper bending form. These two bending tools, the upper bending form and the press-bending mold, therefore have shapes that complement one another in their region of contact with the glass. For preference, it is the press-bending mold that surrounds the pre-bending mold. The press-bending mold may thus advantageously press the edge of the glass without the very edge of the glass even protruding outward beyond the press-bending mold. The press-bending mold therefore protrudes beyond the edge of the glass outwards by a certain distance (the distance "d" in FIG. 15c)). Thus, the press-bending mold has a relatively large path of contact with the glass. The contact path of the press-bending mold has a width generally comprised in the range from 20 to 150 mm. The pre-bending mold may be a solid form or a framelike ring mold, such that the width of its path of contact with the glass can vary in large proportions. It is preferably a framelike ring mold, which is far less expensive than a solid form, the path of contact with the glass of the pre-bending mold (which in this case may be termed a "pre-bending frame") having a width generally comprised in the range from 3 mm to 90 mm, these values being given after said pre-bending mold has been equipped with the fibrous material that comes into contact with the glass in order to soften the contact between the pre-bending mold and the glass and thermally insulate the glass from the mold. These values therefore include the possible widening of the contact path as a result of the fibrous material. A wide contact path, for example measuring 25 mm or more, in particular a width comprised in the range from 25 to 90 mm, and for preference in the range from 50 to 90 mm, is preferred because that allows the weight of the sheet of glass to be spread over a larger surface area and therefore makes it possible to reduce the risks of marking the glass. In addition, because of the greater friction, a larger contact area holds the glass more securely on the pre-bending mold and the position of the glass on this mold will be better maintained despite the lateral movements at high accelerations. Finally, a wider contact path may more readily be equipped with a suction system acting on the underside face of the sheet. The contact path of the pre-bending mold is then provided with orifices through which the suction is applied. In the case of a narrow contact surface (for example measuring 3 mm), the weight of the glass is concentrated over a smaller surface area, and the risks of marking are higher. In addition, a path as narrow as this may prove to be more difficult to equip with an effective suction system. This is why the pre-bending mold advantageously combines a wide contact path, in particular having a width comprised in the range from 25 to 90 mm, and for preference in the range from 50 to 90 mm, with a suction system in which suction is applied to the underside face of the sheet through orifices in the contact path.

As the bending support moves laterally, the upper face of the glass is generally not in contact with any tool, which means to say that it is fully in contact with the gaseous atmosphere.

The pre-bending mold may be manufactured by shaping steel plates over a template or using a casting technique. It is preferably not articulated, so that its shape does not vary during bending. An articulated frame may also prove difficult to equip with a suction system.

The press-bending mold is preferably of the framelike ring mold type (it can be referred to as a "press-bending frame") having a relatively wide path of contact with the glass. The press-bending mold advantageously has a precise geometry and good rigidity because it is intended to confer upon the glass its final or near-final shape and because its shape needs to closely complement that of the upper bending form. This is why the press-bending mold is preferably a component that is thick and heavy so as to give it rigidity and is produced as a casting, its surface for contact with the glass being shaped by milling followed by possible machining to render its contact surface smooth to the naked eye.

In general, all the bending tools that come into contact with the glass (pre-bending mold, upper bending form, upper retaining form, cooling frame) with the exception of the press-bending mold are advantageously covered with a refractory fiber material well known to those skilled in the art so as to soften the contact of the tool with the glass and thus reduce the risks of marking of the glass or of any enamel coating sticking to the tooling. This fibrous material, generally of the woven or nonwoven or knitted type, generally has a thickness ranging from 0.5 to 12 mm.

The invention in particular relates to a device for the thermal bending (generally at between 600 and 750° C.) of sheets of glass, comprising an upper bending form and a bending support, said upper bending form and/or said bending support being laterally mobile relative to one another, said bending support comprising a gravity-bending support referred to as a pre-bending mold and a press-bending mold configured for pressing a sheet of glass against said upper form, of these two (pre-bending and press-bending) molds of the bending support one being surrounded by the other when viewed from above, these two molds of the bending support being able to be given a relative vertical movement with respect to one another. When it is said that the upper bending form and the bending support are mobile laterally relative to one another, that means that just one of these two elements may be laterally mobile, the other being laterally fixed (but potentially able to move vertically) or that both these two elements are laterally mobile. During the relative lateral movement of the bending support and/or of the upper bending form during which these elements pass one above the other, it is the bending support that is under the upper bending form.

The term "lateral" or "laterally" when associated with a movement, means that this movement is horizontal or comprises at least one horizontal component allowing an element of the device to move away from a position by a movement to the side.

When it is the bending support that moves laterally, it is recommended that the glass be stabilized in its optimal position on the bending support. Specifically, it is beneficial for this bending support to move as quickly as possible in order to optimize productivity. The bending support may thus be subjected to high accelerations or decelerations, in particular of at least 1500 mm/sec$^2$, or even of at least 3000 mm/sec$^2$, or even of at least 5000 mm/sec$^2$. In general, the acceleration or deceleration remains below 7500 mm/sec$^2$. A system for moving the bending support allows this lateral movement with these high accelerations.

To achieve that, the bending support may comprise a means of holding the glass in the correct position on it, particularly on the pre-bending mold. In particular, a retaining means such as at least one stop or, more generally, some stops, may come into contact with the edge face of the glass to prevent an undesired lateral movement (which means to say a movement that is horizontal or that has at least one horizontal component) of the sheet with respect to the bending support, in the event of a lateral movement of the bending support. Another retaining means may be a suction system acting on the underside face of the glass, giving rise to a pressure force applied to the upper face of the glass. The suction applied to the sheet by the suction system is in operation during the strong accelerations or decelerations mentioned hereinabove. The glass thus presses more firmly against its support and the undesired lateral movements of the glass on its support become prevented. During suction, the glass is held on the support without shifting laterally with respect thereto, in spite of a strong acceleration or deceleration of the frame bearing the glass. At these instants, the glass is therefore fixed laterally with respect to the support and secured to the support in spite of a strong acceleration or deceleration. If the bending support is provided with a retaining means of the suction type, there is no need for it to comprise a retaining means of the stop type. In general, it is potentially unnecessary for the glass to be retained on its support when it is resting on the pre-bending mold.

According to an alternative form, suction is applied through orifices in the contact path of the pre-bending mold. In this case, the frame comprises at least one closed chamber under the contact path, orifices passing through the frame of the closed chamber at the machined surface of the frame. The inside of the closed chamber is connected by a duct to a vacuum-producing system. A subatmospheric pressure can thus be created in the closed chamber to cause suction through orifices opening onto the upper machined surface of the frame, this suction continuing through the interposed glass-contact fibrous material. The fibrous material allows the gases to pass (the fibrous material is not gastight) and the space between the fibers is considered to form orifices (namely openings) that allow the suction through. The glass is held firmly on the contact path by the suction. In general, no attempts are made to bend the glass using suction, although the glass does bend nevertheless under gravity. The suction here is rather an action that has a limiting effect on the bending and provides a possibility of influencing this bending. Specifically, during a gravity bending on a frame, the glass slides on the frame during the bending and as a result of the bending. During this slippage, the edge of the glass heads slightly toward the center of the frame. The suction has a tendency to retain the glass and therefore tends to limit this slippage of the glass. It is therefore possible to use the amount of suction as a tool for controlling the gravity bending. Strong suction reduces the significance of the gravity bending. The pre-bending mold is first and foremost a mold for transporting the glass with high acceleration or deceleration. The contact path has a shape corresponding to the shape desired at the end of supporting on the pre-bending mold. According to this alternative form, suction through the contact path may be applied through just part thereof, in particular at two or three or four or five or six separate zones. All that is then required is for the machined surface of the pre-bending mold to be holed only at the points that correspond to these zones, thereby very significantly reducing the cost of manufacture as compared with a situation in which it is the entirety of the machined surface of the pre-bending mold that is equipped with orifices. Formed under each pierced zone is a closed chamber that can be placed under vacuum by a duct connected to a suction system. The suction is therefore generated only in the local zones. The retaining effect on the pre-bending mold is sufficient and the system allowing this is less complex than if the suction were to affect the entire contact path of the pre-bending mold. All that is required is for contact between the contact path of the pre-bending mold and the glass to be sufficient, at least at certain zones equipped with suction orifices, for it to be possible to create a vacuum. Specifically, if the shapes of the contact path of the pre-bending mold and that of the glass differ too greatly, then all the suction will be able to do is create an uninterrupted stream of air between the pre-bending mold and the glass.

According to another alternative form, suction is applied to the central zone of the sheet through the inside of the pre-bending mold. In this case, the pre-bending mold is equipped with a plenum positioned under the central zone of the underside face of the sheet to impart a subatmospheric pressure thereto. This plenum is connected airtightly to the frame so as to be able to sustain the vacuum under the glass. The plenum is connected by a duct to a vacuum-producing system. In this configuration and depending on the intensity of the vacuum produced, the suction may cause the glass to bend. In general, the contact path is not flat but has a shape corresponding to the post-bending shape desired on the pre-bending mold. In this alternative form, it is enough for sufficient sealing to be achieved between the contact path and the glass around the entire periphery of the glass as soon as the glass is placed on the contact path for the suction to be able to play its part.

According to these two alternative forms, bearing in mind the fact that a fibrous material preferably covers the pre-bending mold in order to soften the contact with the glass, the seal between the glass and the contact path cannot be perfect, it merely needs to be sufficient that a pressure force presses against the glass to press the sheet firmly against the contact path. The open porosity of the fibrous material plays a part in the vacuum that can be created by suction and therefore also in the pressure force applied from above to the glass.

A pre-bending mold equipped with a suction system as has just been described may also comprise a blowing system blowing toward the underside face of the glass. This blowing may be intended to assist with regulating the retaining force pressing on the upper face of the glass by reducing same, or with reducing the risk of marking of the glass by contact with the suction frame. The blowing is applied to the underside face of the glass over a region distinct from the one used for the suction.

The pre-bending mold and the press-bending mold of the bending support are themselves supports for the glass and have their face of contact with the glass oriented upward. The pre-bending mold has curvatures that are less pronounced than those of the press-bending mold at least in one region. The pre-bending mold applies pre-bending, giving the glass a shape that is intermediate to the shape afforded by the press-bending. The pre-bending on the pre-bending mold may for example represent 10 to 80% of the final bending. This percentage with respect to the final bending can be assessed by placing the glazing on a flat support, convex face uppermost, and by measuring the distance between the flat support and the highest side of the glazing, and by comparing this to a glazing that has been pre-bent only and to a glazing that has been bent into its final shape. Depending on the circumstance, it is also possible to elect to pre-bend the glass predominantly in one direction only (predominantly cylindrical pre-bending) and then bend the glass predominantly in the direction orthogonal to the pre-dominant direction of the pre-bending. In this case, the pre-bending may represent more than 80% of the final bending and even come close to 100% of the final bending, it being appreciated that this pre-bending is only partial because it is performed chiefly in just one direction.

An upper bending form has its face for contact with the glass facing downward. This form may be a framelike ring mold (with no contact with the glass in its central region) or may be a solid form. This upper bending form is equipped with a suction means allowing a bent sheet of glass to be retained against it simply by triggering this suction means. This suction means may apply suction through its main face for contact with the glass, in which case this main face comprises at least one orifice and generally a plurality of orifices through which the suction is applied. The suction means may also comprise a skirt surrounding the upper bending form, whether this form be of the solid form or framelike ring mold type. If the upper bending form is a frame, the suction may be exerted through the inside of the frame, but is preferably applied via a skirt. The suction causes an upward flow of air that is enough to hold the glass against the upper bending form. This retention against this upper bending form is put to good use to position under it another support such as the cooling support. The stopping of the suction means allows the upper bending form to release the sheet it was holding against itself onto this other support. It is preferable for the upper bending form to be equipped with a means of suction through at least one orifice through the main face thereof for contact with the glass because in addition to its role in holding the sheet, this suction means also has the role of eliminating the air trapped between the glass and the upper bending form and of correcting any offset between the glass and the form after the pressing, thereby allowing bending that better meets the expectations. FIG. 3 of WO2011/144865 provides an example of an upper bending form of which the face for contact with the glass (which face is referenced 31 in that figure) is provided with orifices through which a suction means may act in order to hold a sheet against it. This same upper bending form is also provided with a skirt (referenced 39) surrounding it, an upward flow of air being able to be brought about by suction in the space between the skirt and the upper bending form.

On the pre-bending mold, the glass sags under gravity under the effect of its self-weight. The gravity bending conferred on the glass is partial and intermediate in relation to the bending conferred to it during the press-bending step which follows the gravity bending. The sheets of glass are bent by the device according to the invention at their deformation temperature, the sheet of glass that is to be pressed being partially bent on the pre-bending mold, then the press-bending mold moves into an upper position in relation to the pre-bending mold in order to pick up the sheet of glass and press it against the upper bending form in order to accentuate the bending thereof. If appropriate, partial gravity bending may also be performed on the press-bending mold before it is pressed against the upper bending form. The pre-bending mold and the press-bending mold support at least the periphery of the glass via a contact path. Even if the press-bending mold is a relatively wide frame, it preferably comes into contact with the glass only over a narrow width of the order of 0.5 to 3 mm and right at the extreme periphery of the glass. The great width of the press-bending mold is made necessary by the fact that the glass slips along it during press-bending because its outline when viewed from above becomes smaller as a result of its bending.

A bending support mechanism makes it possible to modify the height wise dimension of the pre-bending mold and of the press-bending mold relative to one another. Mention is therefore made of an upper position and of a lower position for each of these molds, it being appreciated that it is possible for just one of these molds to be able to move vertically or that it is possible for both of the two molds to move vertically.

A mold in an upper position has a predominant action with regard to the glass with respect to the other mold. A (pre-bending or press-bending) mold in an upper position generally supports more of the weight of the glass than the other mold. Indeed it is not excluded for one of the (pre-bending or press-bending) molds in the lower position to continue to touch the glass, but this mold does not play a predominant part in supporting the glass. This is why it is considered that it is the mold in the upper position that picks up the glass. In general, at the start of contact of the glass with a (pre-bending or press-bending) mold in an upper position, the mold in the upper position is the only thing in contact with the glass, the other mold not then touching the glass. More generally, when a mold is in the upper position, the other mold, in the lower position, does not touch the glass. However, it is not excluded for the mold in the lower position nevertheless to touch the glass to assist with the action of the first.

In general, the device according to the invention also comprises an upper retaining form, a pneumatic retaining means for retaining a sheet of glass against it. This pneumatic retaining means may be a means blowing upward or a suction means. An upper retaining form has its face for contact with the glass facing downward. This form may be a framelike ring mold (with no contact with the glass in its central region) or may be a solid form. This upper retaining form may be equipped, by way of pneumatic retaining means, with a suction means operating either through a skirt surrounding said form, or through at least one orifice made in its main face of contact with the glass. This suction means allows the glass to be held against the upper retaining form by simple triggering of this suction means. Thus, the main face of the upper retaining form may be solid and comprise a plurality of orifices through which the suction is applied. If this upper retaining form is a frame, the suction may be applied through the inside of the frame, this inside constituting a single large-sized orifice. Suction may also be applied through a skirt, whether the upper retaining form is a solid form or a framelike ring mold. This ease with which a sheet of glass can be held against it is used for positioning the bending support beneath it. If the bending support comprises a mold of the solid form type, then the pneumatic retaining means is of the suction type. This is because, in this case, blowing cannot be used to hold the sheet against the upper retaining form when the bending support is in this form because the blown air would be unable to pass through the bending support. This is also one of the reasons why the pre-bending mold and the press-bending mold are both preferably of the framelike ring mold type, so as to be able to allow blowing air to pass from the pneumatic retaining means through them. The pneumatic raising means can therefore be an upward blowing passing through the pre-bending mold and the press-bending mold during the lateral movement of the bending support positioning itself under the upper retaining form holding the sheet of glass against it.

Switching off the pneumatic (suction or blowing) retaining means allows the upper retaining form to release the sheet it was holding against it on the bending support. The role of this upper retaining form is chiefly to pick up the sheet from the pickup position at the end of the conveying means and place it on the pre-bending mold of the bending support. The upper retaining form may be flat and not generate any thermal bending of the sheet. However, it is not excluded for it to be bent in such a way as to begin to curve the glass by thermal bending of the sheet of glass. This pre-bending may in particular be chiefly of the cylindrical type or alternatively may apply curvatures in two mutually orthogonal directions. The curvature generated by the upper form may even, in one given direction, be the opposite to the curvatures finally conferred upon the glass later on in the process, if the gravity bending has a tendency to progress excessively quickly in certain regions. In this case, this small reverse bending given to the glass is intended to compensate for the great deal of gravity bending that occurs thereafter.

This upper retaining form and/or the bending support are laterally mobile relative to one another, so that the bending support may find itself alternately under the upper retaining form or under the upper bending form. When it is said that the upper retaining form and/or the bending support are mobile laterally relative to one another, that means that it is possible for just one of these two elements to be laterally mobile, the other being laterally fixed (but potentially able to move vertically) or that both these two elements are laterally mobile. During the relative lateral movement of the bending support and/or of the upper retaining form during which they pass one above the other, it is the bending support that is under the upper retaining form. The upper retaining form is used to pick up a sheet of glass arriving in a pickup position and then releases this sheet of glass onto the bending support while the pre-bending mold thereof is in the upper position. The sheets are conveyed one after another by a conveying means leading to the pickup position. On approaching the pickup position, a sheet slows down very significantly and may even stop. As soon as it reaches the pickup position, the glass is moved upward through the action of the pneumatic raising means and until it comes into contact with the upper retaining form.

The conveying means is generally a roller bed. This roller bed leads each sheet of glass one after the other into a position referred to as the pickup position and slows down, or may even pause, in this position, to make it easier to be picked up by the upper retaining form. Too long a stoppage is undesirable because it could cause the rollers to mark the glass. The pickup position (corresponding to one end of the roller bed), the upper bending form, the upper retaining form and the bending support are generally in a bending cell raised to the hot-bending temperature of the glass, namely the plastic deformation temperature of the glass. When a sheet is in the pickup position, the upper retaining form will pick it up using a pneumatic raising means, if appropriate after a lateral movement so as to position itself over the pickup position occupied by a sheet. The pneumatic raising means applies a pressure difference that creates an upward air flow. This may be a blowing from the bottom upwards applied to the underside face of the sheet using a blower (such as the blower referenced 15 in FIG. 3 of EP0255422), or upward suction, either using a skirt surrounding the upper retaining form, or through at least one orifice formed in the main face of the upper retaining form. In the event of blowing being used as a pneumatic raising means and the use of a roller bed as a conveying means, the blowing is performed through the roller bed. For this blowing, a blowing duct to channel the blowing air may be arranged under the conveying means, in particular a roller bed, the flow of air being created in this duct by a blower. Alternatively, this blowing may be applied by a system of compressed-air nozzles blowing through the conveying means, in particular a roller bed. In particular, the nozzles may be positioned between rollers so that they can get closer to the glass. The pneumatic raising means is capable of moving a sheet of glass upward, from its pickup position until it comes into contact with the upper retaining form.

The upper retaining form then holds the sheet against it using a pneumatic retaining means, then, following a relative lateral movement of the upper retaining form and/or of the bending support, the upper retaining form holding the sheet of glass against it moves back above the bending support, the pre-bending mold of which is in the upper position and releases said sheet onto the pre-bending mold where it can be partially bent. For this relative lateral movement, the upper retaining form may be fixed and it is the bending support that positions itself underneath it, or alternatively, the bending support is fixed and it is the upper retaining form that moves to position itself over the bending support, or alternatively still, these two elements move so that ultimately the bending support is back under the upper retaining form. If it is the upper retaining form that is fixed, it is potentially possible to use the same pneumatic means to raise and hold the sheet against it, the pneumatic raising means also being the pneumatic retaining means. However, if it is blowing from underneath that is used to raise the sheet in the pickup position, the movement of the bending support so that it can be positioned under the upper retaining form may possibly disturb the blown flow, which means that it may potentially be preferable for a pneumatic retaining means of the suction type to take over from the pneumatic raising means of the blowing type after the blowing has raised the sheet until it comes into contact with the upper retaining form, in order to hold the sheet against the upper form. This suction means is of the type using suction via at least one orifice in the main face of contact of the upper retaining form, or via a skirt.

After the sheet has been released by the upper retaining form onto the bending support following the stoppage of the pneumatic retaining means holding the sheet against said form, the pre-bending mold being in the upper position, a partial bending of the sheet of glass occurs on the pre-bending mold. The time needed for this partial bending is put to use for transferring the bending support from its position under the upper transfer form into a position under the upper bending form. This transfer is performed by virtue on the one hand of a relative lateral movement of the bending support and/or of the upper retaining form and on the other hand by virtue of a relative lateral movement of the bending support and/or of the upper bending form. If the upper retaining form is laterally fixed, then in general the upper bending form is also laterally fixed, and it is the bending support that shuttles back and forth between a position under the upper retaining form to collect a sheet on its pre-bending mold and a position under the upper bending form to press the sheet against the upper bending form via its press-bending mold. If the bending support is laterally fixed then it is the upper forms that move laterally to position themselves one after the other over the bending support. In this case, the upper retaining form shuttles back and forth between a position above the pickup position for picking up a sheet and a position above the bending support for releasing the sheet onto its pre-bending mold. In this case likewise, the upper bending form shuttles back and forth between a position above the bending support for bending a sheet between it and the press-bending mold of the bending support, and a position for releasing the sheet so that it can be subsequently cooled.

After bending against the upper bending form, the bent sheet is cooled. For this, the sheet may be released by the upper bending form onto a cooling support passing beneath it. To this end, the upper bending form is equipped with a means of suction through its main face that is capable of holding the bent sheet of glass against it, the sheet being held against the upper bending form by its suction means after it has been press-bent, this allowing a laterally mobile cooling frame to position itself under the upper bending form, then the suction means of the upper bending form being stopped, the cooling frame collects the bent sheet of glass released by the upper bending form and then carries it to a cooling zone by lateral movement.

The cooling zone may cool the glass slowly without particularly toughening it. However, advantageously, the cooling zone comprises glass toughening means such as blowing plenums capable of blowing onto the two main faces of a sheet of glass. The blowing may perform a semi-toughening or a toughening in particular of the thermal tempering type. Advantageously, the blowing plenums are in the immediate vicinity of the press-bending station (comprising the upper bending form) and therefore of the bending cell, if any. A cooling frame that has just collected a bent sheet from the upper bending form leaves this position under the upper bending form and, through a lateral movement after exiting any bending cell there might be, positions itself between the blowing plenums in order to receive its toughening treatment, in particular a tempering treatment. Thus, in the cooling zone, the cooling frame supporting a sheet of glass positions itself between the air blowing plenums, and the sheet of glass experiences a blast of air that causes it to cool, in particular of the thermal tempering type. After this blowing of air between the plenums, the cooling frame, through a further lateral movement, may carry the sheet to a cold zone in which it is unloaded. According to another embodiment, after the toughening blowing, the blowing of the lower plenum can be used to move the sheet upward until it comes into contact with the upper plenum, thereby freeing the cooling frame. The latter can then be turned to the bending station, where appropriate inside a bending cell, so as to collect the next sheet that is to be cooled. An additional cooling support can then position itself between the blowing plenums underneath the sheet that has remained in contact with the upper blowing plenum to collect it and carry it to a colder zone and finish its cooling. This additional cooling support may be of the ringframe type or may be made up of simple straight bars. Specifically, at this stage, the glass has set and there is no longer any need to fear deformation under the effect of its self-weight, which means that it is unnecessary for a support to have a shape complementing that of the glass.

The upper bending form (and the press-bending mold that complements it) needs to give the sheet its final or near-final shape. In fact, between the moment at which the upper bending form releases a bent sheet and the moment at which the shape of the sheet has set by cooling, the shape of the sheet can still change a little, in particular by gravity bending on the cooling support. This is why it is beneficial to take account of this change when manufacturing the upper bending form and the press-bending mold, the shapes of which need advantageously to compensate for the changing shape following the release of the bent sheet and until such time as it sets. The shape of the sheet may therefore, as it passes through the bending device according to the invention, undergo a succession of partial bending steps, each of which influences the bending of the sheet. These various steps are as follows:

possibly a bending against the upper retaining form if this is non-flat,
   a gravity bending on the pre-bending mold of the bending support,
   possibly a gravity bending on the press-bending mold of the bending support,
   a press-bending between the press-bending mold and the upper bending form,
   a gravity bending between the release by the upper bending form onto the cooling frame and the setting of the glass by cooling.

The pre-bending may therefore begin on the upper retaining form. The upper retaining form in this case has a pre-bent form on its underside surface. This pre-bending may produce curvatures in two mutually orthogonal directions. According to another embodiment, this pre-bending may be chiefly cylindrical.

The pre-bending may also begin after the flat sheet has been released onto the pre-bending mold incorporated into the bending support. The upper retaining form in this case is a flat form (pickup plan). A sag pre-bending takes place in all instances during transfer under the upper bending form. The transfer time is therefore used for gravity pre-bending.

The pre-bending may be continued on the press-bending mold after the glass has been picked up by the press-bending mold. The gravity sag time may be controlled through the amount of time allowed between the picking-up of the glass by the press-bending mold and the start of the pressing. According to the device and the method according to the invention, the glass is bent progressively. The bending method comprises one or more pre-bending steps and a press-bending step prior to transfer to the cooling zone, in particular a thermal tempering. The purpose of the pre-bending is to bend the glass progressively and to confer upon it curvatures close to those that the press-bending step will confer.

The invention relates to a bending device and to the method that uses said device. The description of the device and of the method have been combined for ease of understanding.

In one particularly suitable embodiment of the method according to the invention, the sheets of glass are conveyed one after another by a conveying means, in particular of the roller bed type, as far as a position referred to as the pickup position, the sheet in the pickup position being raised by a pneumatic raising means, in particular of the type that blows upward, in particular through the roller bed, until it comes into contact with an upper retaining form positioned above the pickup position, said upper retaining form then holding the sheet against it by virtue of a pneumatic retaining means, in particular a suction retaining means, and then following a relative lateral movement of the upper retaining form and/or of the bending support, the upper retaining form holding the sheet of glass against it is positioned over the bending support, the pre-bending mold of which is in an upper position, then the pneumatic retaining means of the upper retaining form is stopped and said sheet is released onto the pre-bending mold so that it can be gravity bent. In particular, while the sheet of glass is on the bending support, following a relative lateral movement of the upper retaining form and/or of the bending support and a relative lateral movement of the upper bending form and/or of the bending support, the upper retaining form is no longer positioned above the bending support and the upper bending form is positioned above the bending support so that the sheet can be press-bent. In particular, for the relative lateral movement of the upper retaining form and/or of the bending support, the bending support is given a lateral movement, the upper retaining form being potentially fixed laterally, and the upper bending form potentially being fixed laterally. According to another alternative form, for the relative lateral movement of the upper retaining form and/or of the bending support, and the relative lateral movement of the upper bending form and/or of the bending support, the upper retaining form and the upper bending form are given a lateral movement and the bending support is potentially fixed laterally.

One advantage of the invention is the uniqueness of each bending tool (just one bending support, just one upper retaining form which possibly applies partial bending, just one upper bending form) as compared with the methods that require the creation of whole sequences of bending supports.

The lateral movement of at least one tool in the device according to the invention drives each sheet one after the next. A lateral movement drives a sheet toward the downstream part of the method and frees up a space in the device further upstream in the method and this space can be immediately occupied by a next sheet. Thus, while one sheet is in the cooling zone, a subsequent first sheet can be on the bending support under the upper bending form and a subsequent second sheet can be in the pickup position under the upper retaining form. Thus, there can be two sheets simultaneously residing in the bending cell with one sheet in the cooling, in particular tempering, zone. Bending is therefore performed in at least two bending steps, affording a notable reduction in the time for which each tool is in use and therefore in the cycle time. During the method of implementing the invention, the subsequent first sheet will replace the sheet in the cooling zone, the subsequent second sheet will replace the subsequent first sheet and a subsequent third sheet will replace the subsequent second sheet, and so on.

Breaking the shaping method down into several bending steps offers a number of advantages. Specifically, several sheets of glass can reside simultaneously in the bending cell. Each tooling is in demand for less time per sheet. This has a significant impact on reducing production cycle times. Furthermore, each sheet is bent progressively in several successive bending steps. The total bending time for each sheet is potentially longer than in a conventional method, giving the glass longer to pre-bend and bend. This progressive aspect of the bending makes it possible to produce sheets of glass of greater complexity and of better optical quality.

BRIEF DESCRIPTION OF THE DRAWINGS

FIG. 18 depicts a pre-bending mold supporting a sheet of glass via a contact path according to an embodiment of the invention, and FIG. 19 depicts a view from above of a bending support for a sheet of glass comprising a pre-bending mold and a press-bending frame surrounding it according to an embodiment of the invention.

FIGS. 1 to 7 depict one embodiment according to the invention whereby the upper retaining form and the upper bending form are fixed laterally and mobile vertically, and it is the bending support that alternately passes beneath one and beneath the other of these two upper forms. In this series of figures, each element maintains its reference no.

FIG. 1 depicts a device according to the invention and the use thereof in a bending method. A bending cell 1, the inside of which is raised to the bending temperature for the sheets of glass that are to be bent, comprises an upper bending form 2, a bending support 3 and an upper retaining form 4. The bending support supports a sheet 10 that has already been partially bent by gravity bending, and is already supported by the press-bending mold so that it can be press-bent. Next to the cell 1 there are, in a cooling zone, two tempering plenums 5 and 6 between which there is a cooling support 7. A roller bed 8 forms a means of conveying sheets of glass 9. The direction of conveying of this bed 8 is perpendicular to the figure. This bed carries the sheets 9 one after the other into the pickup position in the bending cell 1 under the upper retaining form 4. In FIG. 1, the upper retaining form 4 and the upper bending form 2 are empty and in the raised position.

FIG. 2 depicts the same device as that of FIG. 1, but at a later stage. Between these two figures, the two upper forms 2 and 4 have been lowered, a pneumatic raising means of the blowing type (represented by the arrows 20) has been switched on to blow between the rollers 8 and to raise the flat sheet 9 until it comes into contact with the upper retaining form 4. The blowing air is blown in a blowing duct 24. A pneumatic retaining means of the suction type (represented by the arrows 21) has been switched on to hold the sheet 9 against the upper retaining form despite the subsequent switching-off of the pneumatic raising means 20. The sheet 10 has been press-bent between the upper bending form and the press-bending mold 22 of the bending support 3. The suction means (represented by the arrows 23) has been switched on to hold the sheet 10 against the form 2 despite the subsequent separation between the form 2 and the support 3. This suction system 23 has two functions: 1) to hold the sheet against the form for the time taken for a cooling frame to come in beneath it, and 2) to eliminate any bubble between the glass and the upper form allowing bending that better meets expectations.

FIG. 3 depicts the same device as that of FIG. 2, but at a later stage. Between these two figures, the two upper forms 2 and 4 have been raised and now each hold a sheet against them using their suction means through their main face, these being an unbent flat sheet 9 in the case of the upper retaining form 4 and a bent sheet 10 in the case of the upper form 2.

FIG. 4 depicts the same device as that of FIG. 3, but at a later stage. Between these two figures, the bending support 3 has moved laterally to position itself under the upper retaining form 4 to collect the sheet 9. The pre-bending mold 40 of the support 3 has moved into an upper position with respect to the press-bending mold 22. After the opening of the door 41, the cooling frame 7 has entered the cell 1 by a lateral movement and has positioned itself under the upper bending form 2 to collect the sheet 10.

FIG. 5 depicts the same device as that of FIG. 4, but at a later stage. Between these two figures, the upper retaining form 4 has lowered and released the sheet 9 onto the pre-bending mold 40 of the support 3 so that it can be gravity bent. The upper bending form 2 has lowered and released the bent sheet 10 onto the cooling support 7.

FIG. 6 depicts the same device as that of FIG. 5, but at a later stage. Between these two figures, the two upper forms 4 and 2 have been raised empty and the support 3 bearing the sheet 9 has moved laterally to position itself under the upper bending form 2, this transfer time being put to use to gravity bend the sheet 9 on the pre-bending mold 40. If appropriate, in order to avoid a lateral movement of the sheet on the bending support, the position of the sheet on the pre-bending mold is maintained by stops that come into contact with the edge face of the glass.

Figure 1:
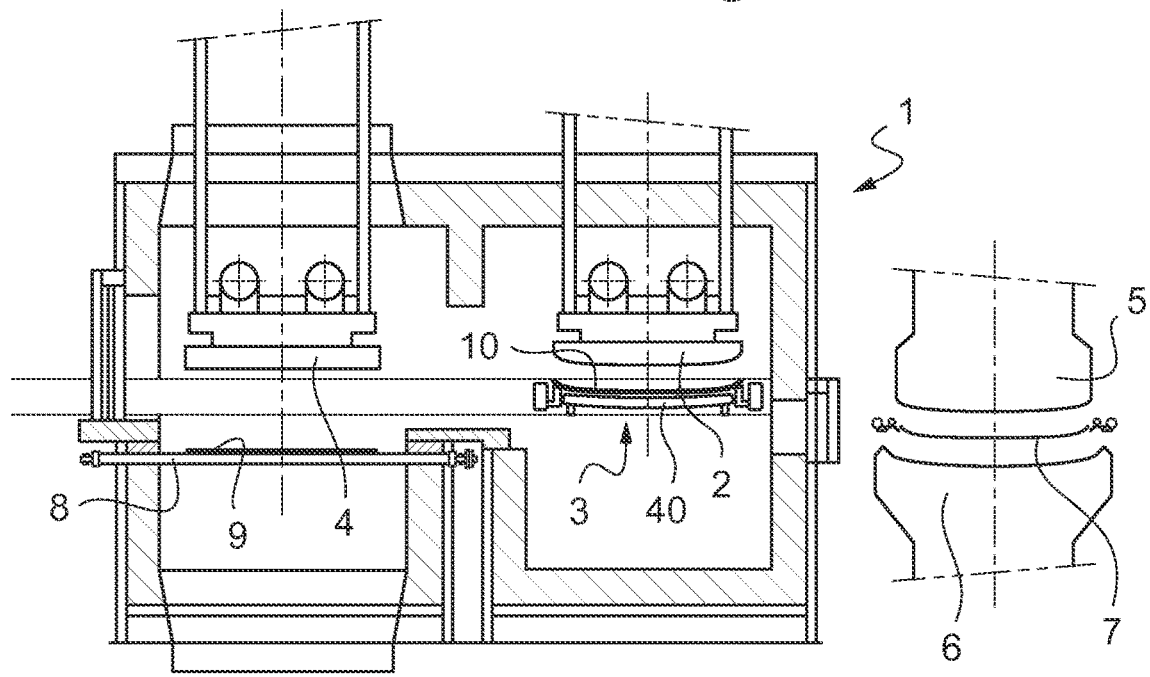
FIGS. 1-7 describe a device for bending sheet according to an embodiment of the invention, whereby the upper retaining form and the upper bending form are fixed laterally and mobile vertically.
Figure 2:
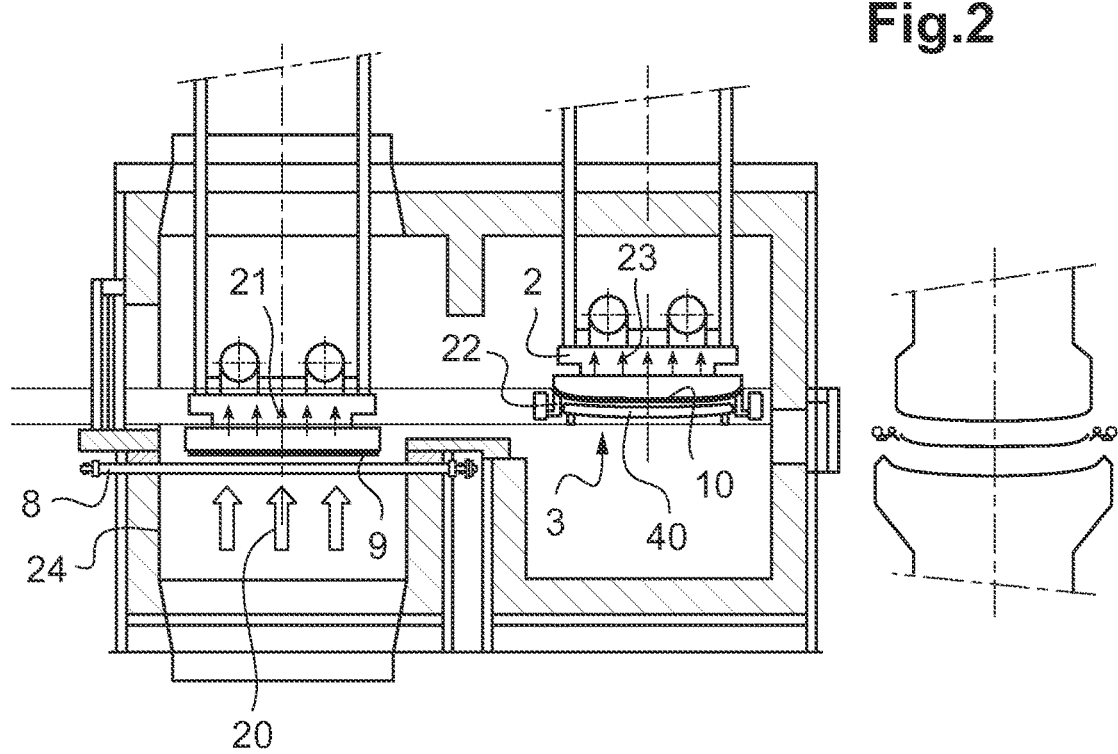
Figure 3:
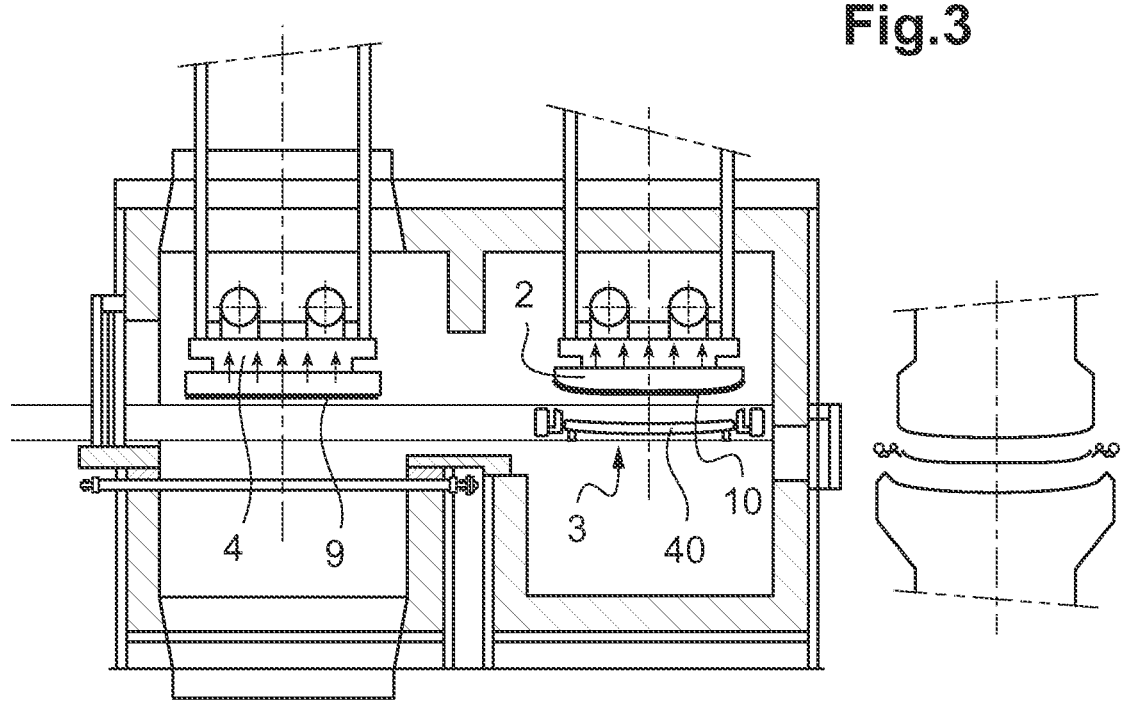
Figure 4:
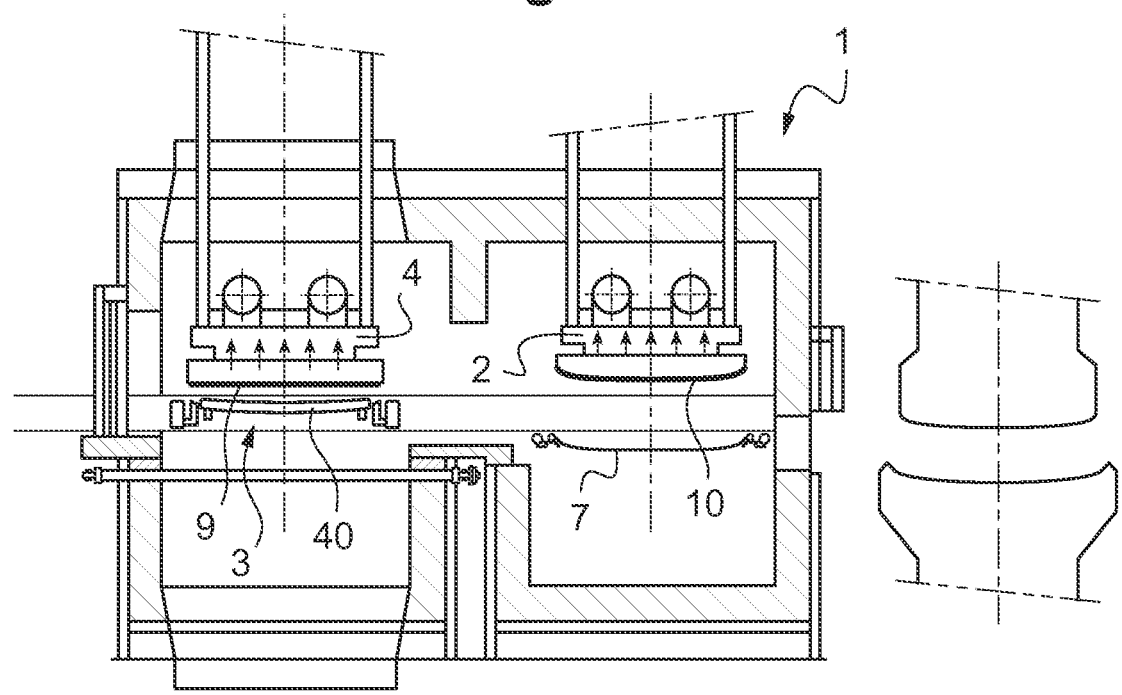
Figure 5:
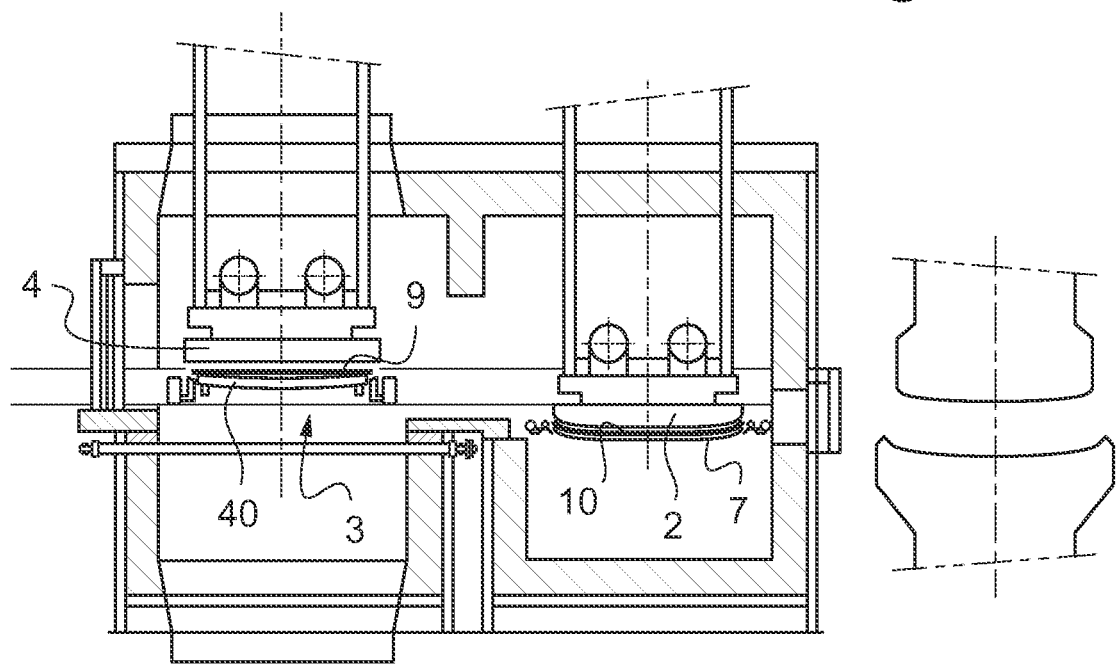

The cooling support 7 has moved laterally to extract the sheet 10 from the cell 1 and to place it between the tempering plenums 5 and 6, then the door 41 has closed again.

Figure 6:
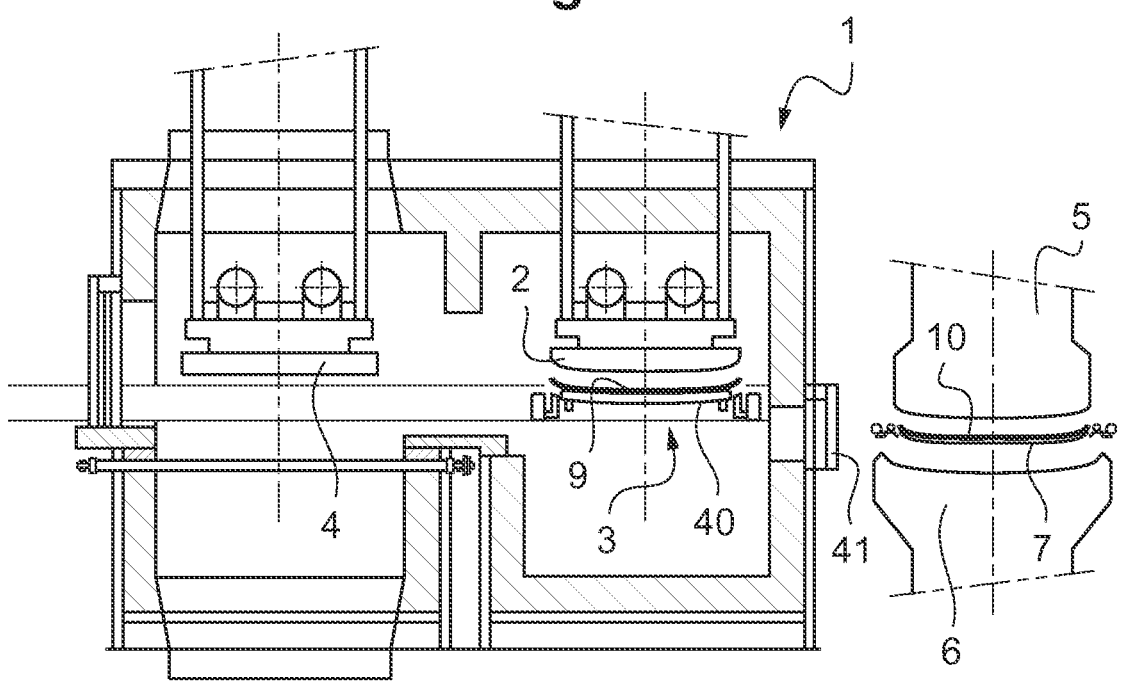
Figure 7:
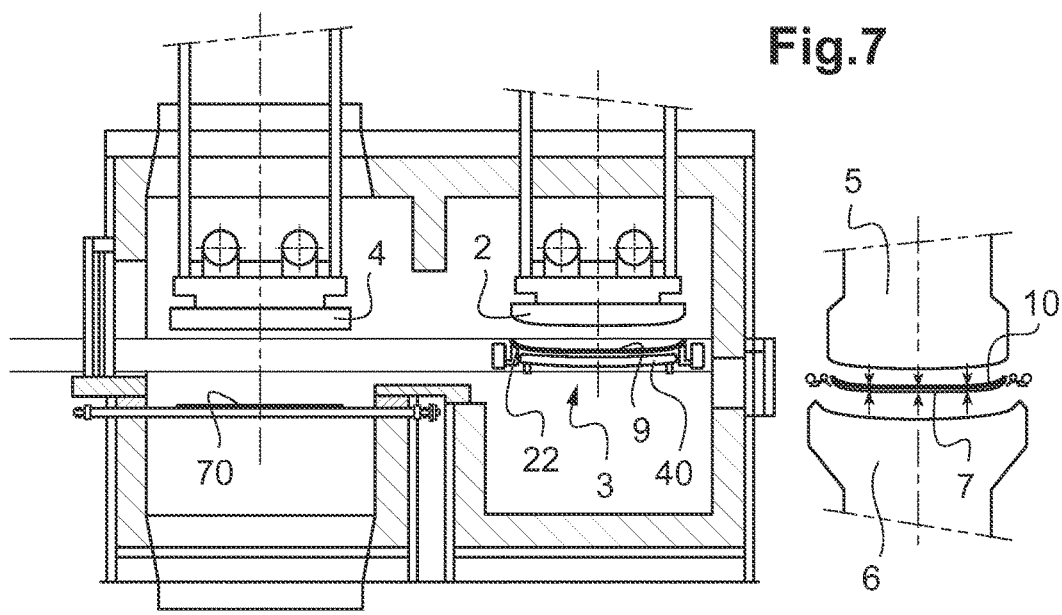

FIG. 7 depicts the same device as that of FIG. 6, but at a later stage. Between these two figures, the tempering plenums have begun to blow air onto the two faces of the sheet 10 with a view to tempering it, the press-bending mold 22 has moved into an upper position to pick up the sheet 9 with a view to pressing it against the upper bending form 2, a flat sheet 70 has arrived in the pickup position under the upper retaining form 4. This then is a repeat of a configuration similar to that of FIG. 1 except that the sheet 70 has taken the place of the sheet 9 and will undergo the same process thereas, the sheet 9 has taken the place of the sheet 10 and will undergo the same process thereas, the sheet 10 will be removed from its position between the plenums for example by a lateral movement allowing it to be unloaded from the cooling support 7.

FIGS. 8 to 14 depict an embodiment according to the invention whereby the bending support is fixed laterally and it is the upper retaining form and the upper bending form that move laterally (and vertically) in the bending cell. In this series of figures, each element maintains its reference no.

Figure 8:
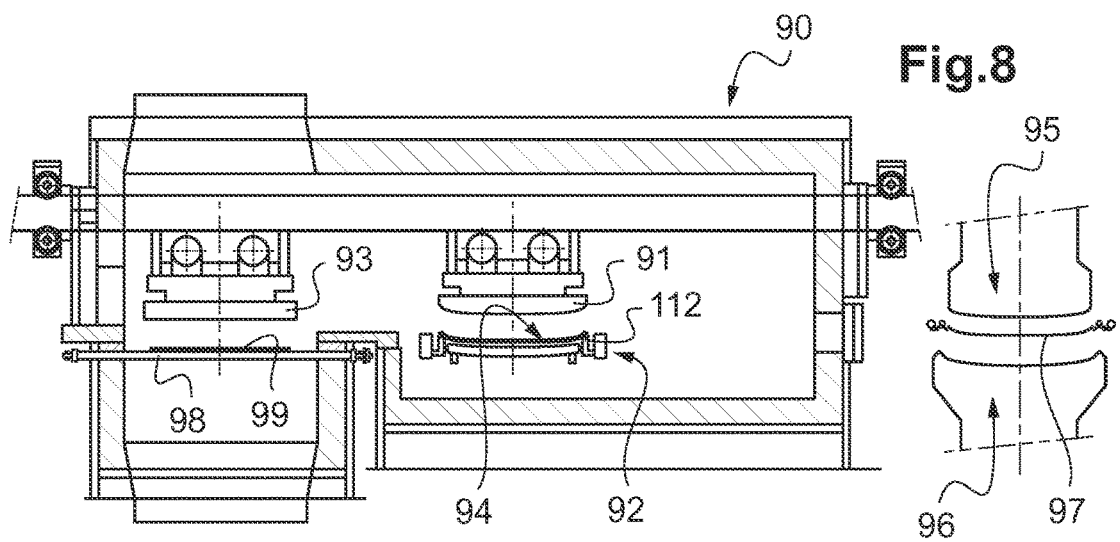
FIGS. 8-14 describe a device for bending sheet according to an embodiment of the invention, whereby the bending support is fixed laterally and the upper retaining form and the upper bending form move laterally (and vertically) in the bending cell.

FIG. 8 depicts a device according to the invention and the use thereof in a bending method. A bending cell 90, the inside of which is raised to the bending temperature of the sheets of glass that are to be bent comprises an upper bending form 91, a bending support 92 and an upper retaining form 93. The bending support 92 supports a sheet 94 already partially gravity bent, and already supported by the press-bending mold 112 so that it can be press-bent. Next to the cell 90 there are, in a cooling zone, two tempering plenums 95 and 96 between which there is a cooling support 97. A roller bed 98 forms a means of conveying sheets of glass 99. The direction of conveying of this bed 98 is perpendicular to the figure. This bed brings the sheets one after another into the pickup position above which the upper retaining form 93 can be positioned. In FIG. 8, the upper retaining form 93 and the upper bending form 91 are empty and in the raised position. The upper retaining form 93 is above the pickup position, which is occupied by a flat sheet 99.

Figure 9:
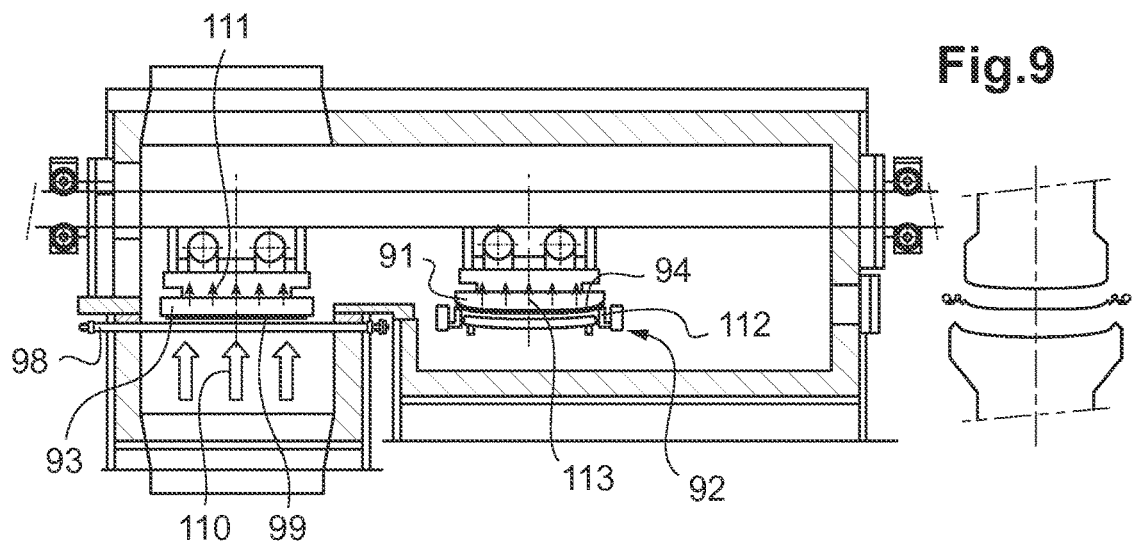

FIG. 9 depicts the same device as that of FIG. 8, but at a later stage. Between these two figures, the two upper forms 91 and 93 have lowered, a pneumatic raising means of the blowing type (represented by the arrows 110) has been switched on to blow between the rollers 98 and to raise the flat sheet 99 until it comes into contact with the upper retaining form 93. A pneumatic retaining means of the suction type (represented by the arrows 111) has been switched on to hold the sheet 99 against the upper retaining form despite the later switching-off of the pneumatic raising means 110. The sheet 94 has been bent by pressing between the upper bending form 91 and the press-bending mold 112 of the bending support 92. The suction means (represented by the arrows 113) has been switched on to hold the sheet 94 against the form 91 despite the subsequent separation between the form 91 and the support 92.

Figure 10:
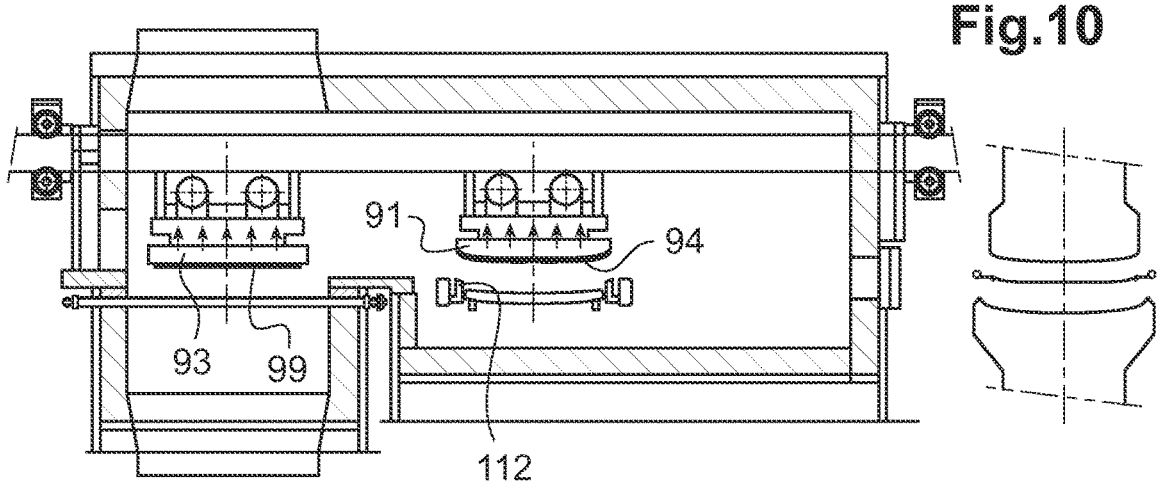

FIG. 10 depicts the same device as that of FIG. 9, but at a later stage. Between these two figures, the two upper forms 93 and 91 have been raised and each hold a sheet against them by virtue of their means of suction through their main face, a non-bent flat sheet 99 in the case of the upper retaining form 93 and a bent sheet 94 in the case of the upper bending form 91.

Figure 11:
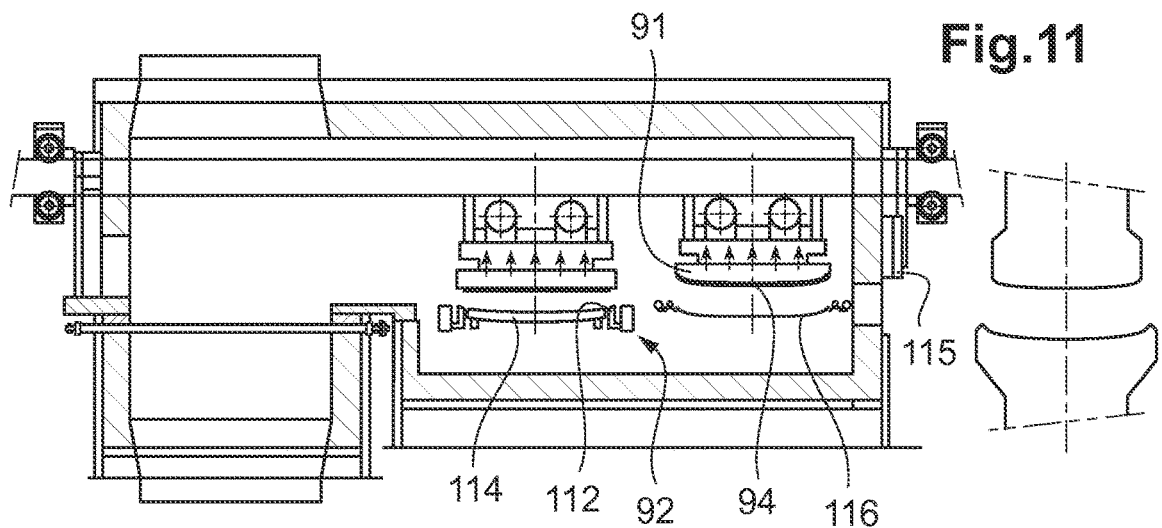

FIG. 11 depicts the same device as that of FIG. 10, but at a later stage. Between these two figures, the upper retaining form has moved laterally to position itself above the bending support 92, with a view to releasing the sheet 99 thereonto. The pre-bending mold 114 of the support 92 has moved into an upper position with respect to the press-bending mold 112 in order to receive the sheet 99. The upper bending form 91 has also moved laterally. After the opening of the door 115, the cooling frame 116 has entered the cell 90 via a lateral movement and positioned itself under the upper bending form 91 in order to receive the sheet 94.

Figure 12:
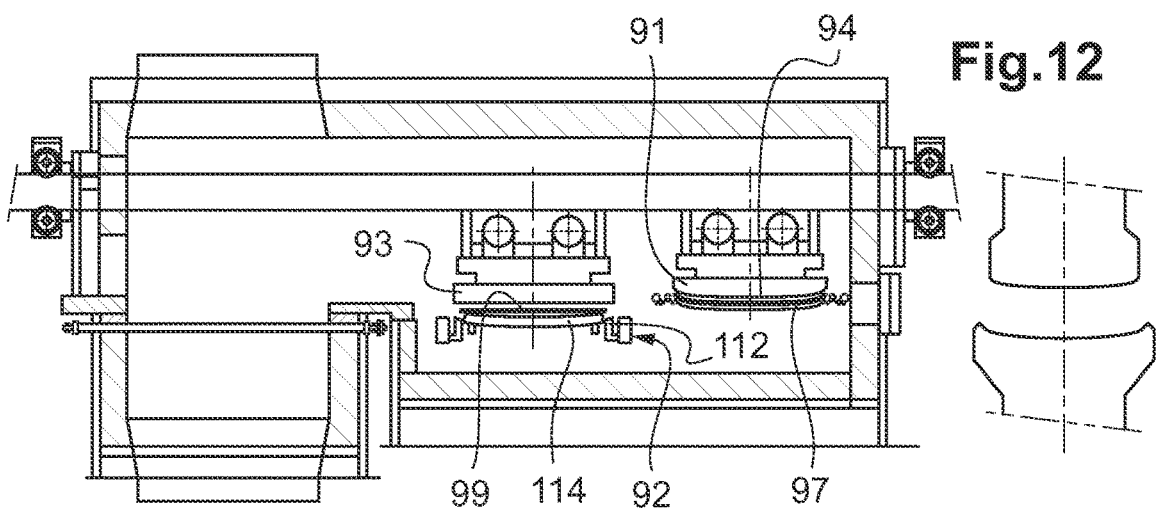

FIG. 12 depicts the same device as that of FIG. 11, but at a later stage. Between these two figures, the upper retaining form 93 has been lowered and has released the sheet 99 onto the pre-bending mold 114 of the support 92 so that it can be gravity bent. The upper bending form 91 has been lowered and has released the bent sheet 114 onto the cooling support 97.

Figure 13:
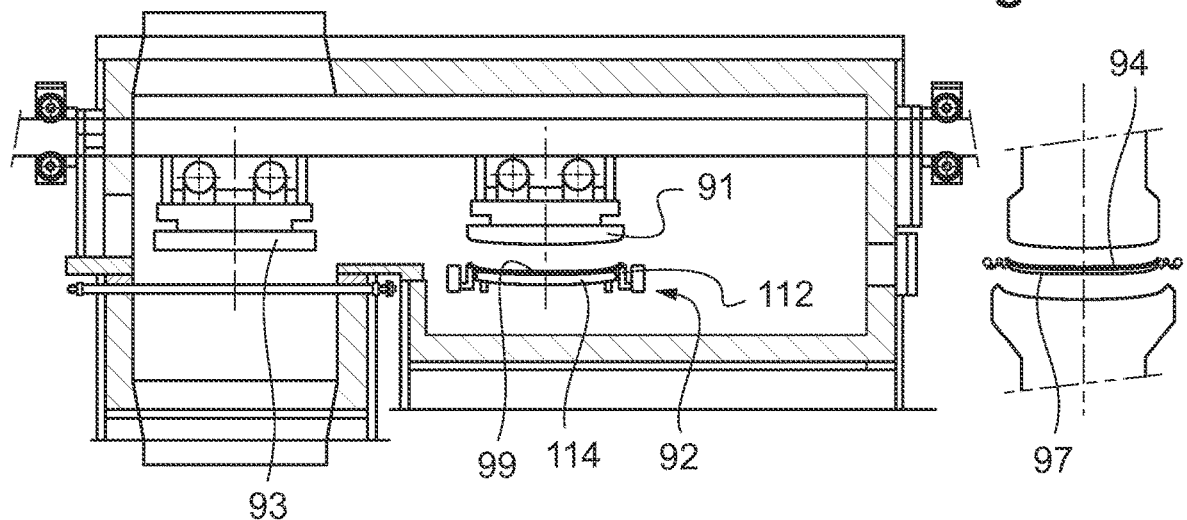

FIG. 13 depicts the same device as that of FIG. 12, but at a later stage. Between these two figures, the two upper forms 93 and 91 have been raised empty and have moved laterally, the upper retaining form 93 so as to return to its position above the pickup position and the upper bending form 91 so as to return to its position above the bending support 92. This transfer time for the upper forms has been put to use to gravity bend the sheet 99 on the pre-bending mold 114. The cooling support 97 has moved laterally to extract the sheet 94 from the cell 90 and to place it between the tempering plenums 95 and 96, then the door 115 has closed again.

Figure 14:
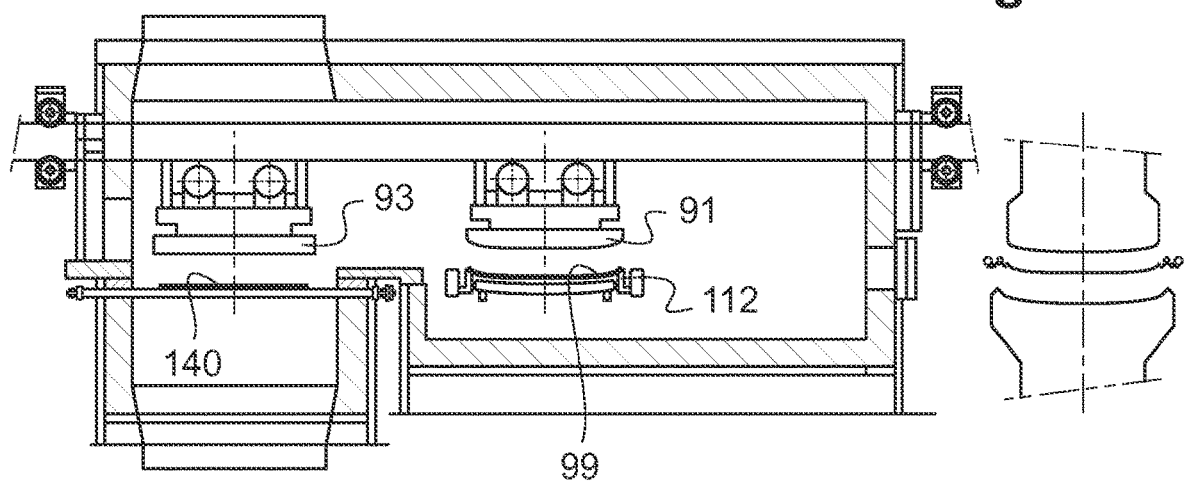

FIG. 14 depicts the same device as that of FIG. 13, but at a later stage. Between these two figures, the tempering plenums have begun to blow air onto the two faces of the sheet 94 with a view to tempering it, the press-bending mold 112 has moved into the upper position to pick up the sheet 99 with a view to pressing it against the upper bending form 91, a flat sheet 140 has arrived at the pickup position under the upper retaining form 93. This then is a return to a configuration similar to that of FIG. 8 except that the sheet 140 has taken the place of the sheet 99 and will undergo the same process thereas, the sheet 99 has taken the place of the sheet 94 and will undergo the same process thereas, the sheet 94 will be removed from its position between the plenums for example by a lateral movement of the cooling support 97 allowing it to be unloaded from said cooling support 97.

Figure 15:
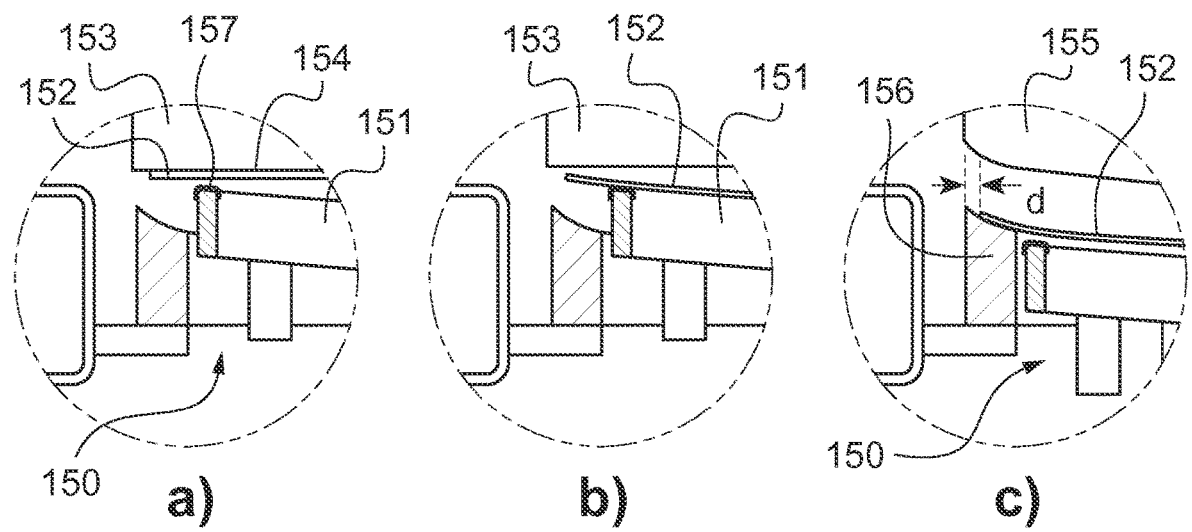
FIGS. 15a-15c depict part of the bending support and the move to the upper or lower position of the pre-bending mold and of the press-bending mold according to an embodiment of the invention.

FIG. 15 depicts part of the bending support and the move to the upper or lower position of the pre-bending mold and of the press-bending mold. FIG. 15a) depicts the bending support 150, the pre-bending mold 151 of which is in the raised position, able to receive the sheet 152 held against the upper retaining form 153 by the pneumatic retaining means of the suction type acting through its main face 154 in contact with the glass. The contact path of the pre-bending mold is covered with a fibrous material 157 well known to those skilled in the art to soften the contact between the tool and the glass and reduce the risks of marking and to insulate the glass from the pre-bending mold. In FIG. 15b), because the suction means of the upper retaining form 153 has been switched off, the sheet 152 has been collected by the pre-bending mold 151. The gravity bending of the sheet 152 on the pre-bending mold 151 has begun. Between FIG. 15b) and FIG. 15c), there has been a relative lateral movement of the upper forms and of the bending support 150, such that the upper bending form 155 is back above the bending support 150. In FIG. 15c), the press-bending mold 156 has moved into the upper position and has picked up the sheet 152. The press-bending mold protrudes beyond the edge of the glass by a distance d.

Figure 16:
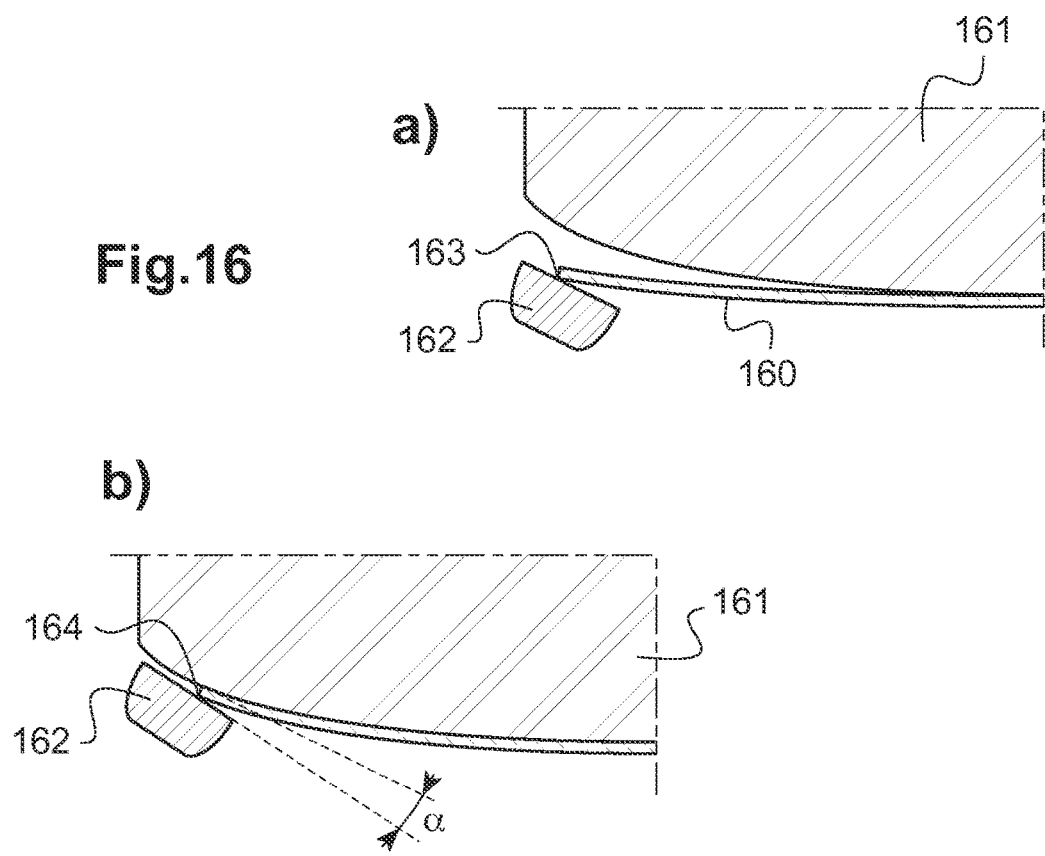
FIGS. 16a-16b depict the press-bending of a pre-bent sheet of glass between an upper bending form and a press-bending mold according to an embodiment of the invention.

FIG. 16 depicts the press-bending of a pre-bent sheet of glass 160 between an upper bending form 161 and a press-bending mold 162. At a), the mold 162 has begun to push the sheet 160 against the form 161, so that the central zone of the sheet has begun to come into contact with the central zone of the upper form 161. At this stage, the zone of contact of the sheet with the mold 162 is situated in the upper part 163 of the mold 162. At b), it is the end of pressing and the periphery of the sheet is also in contact with the upper bending form 161. It may be noted that the mold 162 touches only a thin strip of glass at its end, the mold diverging from the glass when progressing toward the center, forming an angle of approach α. This reduces the risks of the mold 162 marking the glass. The extreme edge of the glass does not protrude outward beyond the press-bending mold 162. During bending, the more the glass is bent, the more the edge of the glass slips on the mold 162 until ultimately it finds itself in the lower half of the width of the contact path 164 of the mold 162. The upper form 161 and the press-bending mold 162 have complementing shapes at their zone of contact with the glass. It will be noted that the shapes of these two tools no longer complement one another with distance away from the contact zone.

Figure 17:
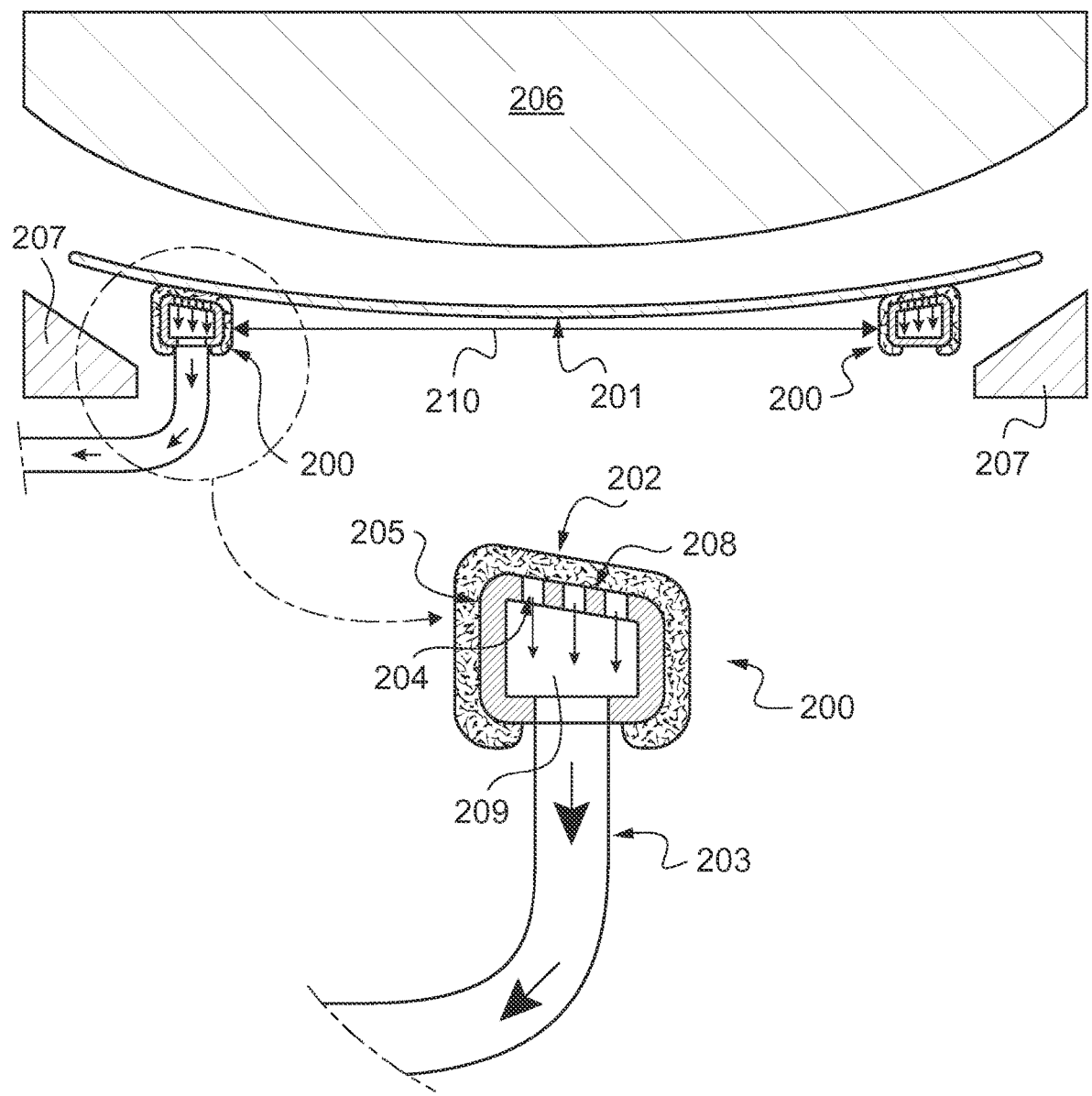
FIG. 17 depicts a bending support comprising a pre-bending mold supporting a sheet of glass via a contact path according to an embodiment of the invention.

FIG. 17 depicts a bending support according to the invention comprising a pre-bending mold 200 supporting a sheet of glass 201 via a contact path 202. The pre-bending mold is provided with a suction system to improve the retention of the glass thereon during high accelerations or decelerations. When viewed from above, the pre-bending mold and its contact path, have the shape of an annulus surrounding an opening 210. This contact path is made up of a refractory fibrous material 205 well known to those skilled in the art for equipping tools that are to come into contact with hot glass. This fibrous material in particular covers the machined upper surface 208 of the pre-bending mold under which has been constructed a closed chamber 209 that can be placed under vacuum, said upper surface 208 being pierced. The fibrous material is soft enough to conform to the shape of the machined upper surface 208 of the pre-bending mold. The inside of the closed chamber 209 is connected to a vacuum creating system via the duct 203. The suction passes through orifices 204 present in the machined upper surface of the pre-bending mold, then through the fibrous material 205, the latter not being designed to be gastight. It is considered that it too comprises orifices that allow the aspirated air flow to pass through. In this embodiment, the contact path is slightly curved. A degree of pre-bending may be performed on this pre-bending mold. Another bending tool consists of the upper bending form 206 and of a press-bending frame 207, which surrounds the pre-bending mold 200. At the appropriate moment, which means to say when the transfer of the glass has been performed so that it is positioned under the upper bending form 206, the pre-bending mold is lowered allowing the press-bending frame to take over the glass and the upper form 206 is lowered to press the sheet against the press-bending frame 207. The suction is triggered in order to hold the sheet on the pre-bending mold during the transfer of the glass until it is under the upper bending form. This transfer time can be put to use for performing a gravity pre-bending on the pre-bending mold. Once the glass is in the correct position, the suction is switched off so that the pre-bending mold no longer holds the glass and so that the press-bending frame can take over the sheet.

FIG. 18 depicts a pre-bending mold 300 supporting a sheet of glass 301 via a contact path 303. This contact path is made up of a refractory fibrous material 305 well known to those skilled in the art for equipping tools that are to come into contact with hot glass. This fibrous material in particular covers the upper surface of a ring-shaped metal frame 306 surrounding an opening 311. The metal frame 306 gives the contact path the desired shape, the fibrous material being soft enough to conform to the shape of the upper face of the metal frame 306. The frame is connected by its side that is the opposite side to the contact path, to a plenum 307 forming a volume 308 under the lower surface 309 of the sheet of glass. The plenum is connected to a duct 310 allowing a vacuum to be generated in the volume 308, after a sheet of glass has been deposited on the contact path. Thus, suction is applied to the central zone of the underside face 309 of the sheet, through the opening 311 surrounded by the pre-bending mold. This vacuum accentuates the force applied to the upper face of the sheet 301. The sheet thus rests more firmly on the pre-bending mold and is thus better held in position despite the lateral movements of the pre-bending mold. Like with the bending support in FIG. 17, this pre-bending mold may be intended to position the sheet under an upper bending form, a press-bending frame surrounding the pre-bending mold then taking over control of the sheet in order to bend it against the upper bending form, according to the principle already outlined in respect of FIG. 17.

FIG. 19 depicts a view from above of a bending support 250 for a sheet of glass comprising a pre-bending mold 251 and a press-bending frame 252 surrounding it. The contact path 253 of the pre-bending mold comprises 3 zones 254 (which are cross-hatched), pierced with orifices so that suction can be applied to enhance the retention of the glass on the contact path. The suction is therefore applied through just part of the contact path of the pre-bending mold. Formed under the pierced zone is a closed chamber 255 that can be placed under vacuum by ducts (not depicted) connected to a suction system. The suction is therefore generated in three localized zones only, which are connected to a suction system. This localized suction reduces the tooling costs and simplifies the suction system in the pre-bending mold.

The invention claimed is:

1. A device for bending sheets of glass, comprising an upper bending form and a bending support, said upper bending form and/or said bending support being laterally mobile relative to one another, said bending support comprising a gravity pre-bending mold constructed and arranged to carry out a controlled gravity bending of a sheet of glass and a press-bending mold configured for pressing the sheet of glass against said upper bending form, one of the gravity pre-bending and press-bending molds being surrounded by the other one of the gravity pre-bending and press-bending molds when viewed from above, at least one of the gravity pre-bending and press-bending molds being able to be given a relative vertical movement with respect to the other one of the gravity pre-bending and press-bending molds, wherein the gravity pre-bending mold has a contact path with the sheet of glass, the contact path having a predetermined shape that remains the same while supporting the sheet of glass, and wherein the gravity pre-bending mold is a frame of which the contact path for the sheet of glass has a width comprised in the range from 3 mm to 90 mm.

2. The device as claimed in claim 1, further comprising an upper retaining form provided with a pneumatic retaining system, said upper retaining form and/or said bending support being laterally mobile relative to one another, so that the bending support is arranged to alternately find itself below the upper retaining form or below the upper bending form.

3. The device as claimed in claim 2, wherein the upper retaining form is flat or bent.

4. The device as claimed in claim 2, further comprising a bending cell that is raisable to a bending temperature, including a pickup position of the sheet of glass, the upper bending form, the upper retaining form and the bending support.

5. The device as claimed in claim 2, wherein the bending support is arranged to shuttle back and forth between a position below the upper retaining form to collect a sheet of glass on its gravity pre-bending mold and a position below the upper bending form in order to press the sheet of glass against the upper bending form via its press-bending mold.

6. The device as claimed in claim 5, wherein the bending support is able to be given a lateral movement with an acceleration or deceleration of at least 1500 mm/sec$^2$ and of less than 7500 mm/sec$^2$.

7. The device as claimed in claim 6, wherein the bending support comprises a retaining system comprising at least one stop able to come into contact with an edge face of the sheet.

8. The device as claimed in claim 5, wherein the width is comprised in the range from 25 to 90 mm.

9. The device as claimed in claim 8, wherein the width is comprised in the range from 50 to 90 mm.

10. The device as claimed in claim 5, wherein the gravity pre-bending mold comprises a retaining system comprising a suction system acting on an underside face of the sheet of glass, through orifices in the contact path for the sheet of glass.

11. The device as claimed in claim 10, wherein a suction provided by the suction system is strong enough to prevent lateral movement of the sheet of glass on the gravity pre-bending mold during an acceleration or deceleration.

12. The device as claimed in claim 2, wherein the upper retaining form shuttles back and forth between a position above a pick-up position for picking up a sheet of glass and a position above the bending support for releasing the sheet of glass onto its gravity pre-bending mold, and wherein the upper bending form shuttles back and forth between a position above the bending support for bending a sheet of glass between it and the press-bending mold of the bending support, and a position for releasing the sheet of glass so that the sheet of glass can be cooled.

13. The device as claimed in claim 2, wherein the pneumatic retaining system is a suction system configured to hold the sheet of glass against it.

14. The device as claimed in claim 1, further comprising a conveying system configured to convey sheets of glass one after the other, bringing each sheet of glass into a pick-up position for being picked up by an upper retaining form and a pneumatic raising system configured to move a sheet of glass upwards from its pickup position until the sheet of glass comes into contact with the upper retaining form.

15. The device as claimed in claim 14, wherein the conveying system is a roller bed and wherein the pneumatic raising system is a system configured to blow upward through the roller bed.

16. The device as claimed in claim 1, wherein the upper bending form is equipped with a suction system configured to hold a bent sheet of glass against it.

17. The device as claimed in claim 1, further comprising a cooling frame that is laterally mobile and able to position itself below the upper bending form to collect a bent sheet of glass released by the upper bending form and capable of driving said bent sheet of glass to a cooling zone.

18. The device as claimed in claim 1, wherein the gravity pre-bending mold includes an upper bent surface to receive and support the sheet of glass during the gravity bending such that the sheet of glass is supported by the upper bent surface from reception of the sheet of glass by the gravity pre-bending mold to a transfer of the sheet of glass from the gravity pre-bending mold to the press-bending mold.

19. A method of preparing bent sheets of glass comprising bending the sheets of glass at their thermal bending temperature using a device for bending sheets of glass, comprising an upper bending form and a bending support, said upper bending form and/or said bending support being laterally mobile relative to one another, said bending support comprising a gravity pre-bending mold constructed and arranged to carry out a controlled gravity bending of a sheet of glass and a press-bending mold configured for pressing the sheet of glass against said upper bending form, one of the gravity pre-bending and press-bending molds being surrounded by the other one of the gravity pre-bending and press-bending molds when viewed from above, at least one of the gravity pre-bending and press-bending molds being able to be given a relative vertical movement with respect to the other one of the gravity pre-bending and press-bending molds, the method comprising bending a sheet of glass by gravity on the gravity pre-bending mold, then moving the press-bending mold into an upper position with respect to the gravity pre-bending mold in order to pick up the sheet of glass, then pressing the sheet of glass against the upper bending form, wherein the gravity pre-bending mold has a contact path with the sheet of glass, the contact path having a predetermined shape that remains the same while supporting the sheet of glass, and wherein the gravity pre-bending mold is a frame of which the contact path for the sheet of glass has a width comprised in the range from 3 mm to 90 mm.

20. The method as claimed in claim 19, wherein the upper bending form is provided with a suction system configured to hold a bent sheet of glass against it, the bent sheet of glass being held against the upper bending form by the suction system after press-bending with the press-bending mold, a laterally mobile cooling frame passing under the upper bending form, then the suction system of the upper bending form is stopped and the cooling frame collects the bent sheet of glass released by the upper bending form and drives the bent sheet of glass in a lateral movement toward a cooling zone.

21. The method as claimed in claim 20, wherein in the cooling zone, the cooling frame supporting a sheet of glass positions itself between air-blowing plenums, the sheet of glass experiencing a blast of air causing it to cool.

22. The method as claimed in claim 20, wherein the sheets of glass are conveyed one after the other by a conveying system, as far as a pickup position, the sheet of glass in the pickup position being raised up by a pneumatic raising system, until the sheet of glass comes into contact with an upper retaining form positioned above the pickup position, said upper retaining form then holding the sheet of glass against it by virtue of a pneumatic retaining system, and then following a relative lateral movement of the upper retaining form and/or of the bending support, the upper retaining system holding the sheet of glass against it is positioned over the bending support, the gravity pre-bending mold of which is in an upper position, then the pneumatic retaining system of the upper retaining form is stopped and said sheet of glass is released onto the gravity pre-bending mold so that the sheet of glass can be gravity bent.

23. The method as claimed in claim 22, wherein the pickup position, the bending support, the upper retaining form and the upper bending form are inside a bending cell raised to the thermal bending temperature of the sheets of glass.

24. The method as claimed in claim 22, wherein while the sheet of glass is on the bending support, following the relative lateral movement of the upper retaining form and/or of the bending support and following a relative lateral movement of the upper bending form and/or of the bending support, the upper retaining form is no longer positioned above the bending support and the upper bending form is positioned above the bending support so that the sheet of glass can be press-bent.

25. The method as claimed in claim 22, wherein for the relative lateral movement of the upper retaining form and/or of the bending support, the bending support is given a lateral movement, the upper retaining form being potentially fixed laterally, and the upper bending form potentially being fixed laterally.

26. The method as claimed in claim 25, wherein the bending support is given a lateral movement comprising an acceleration or deceleration of at least 1500 mm/sec$^2$ and of less than 7500 mm/sec$^2$.

27. The method as claimed in claim 26, wherein during the acceleration or declaration of the lateral movement of the bending support, the sheet of glass is held on the gravity pre-bending mold by suction generated by a suction system acting on the underside face of the sheet of glass, through an orifice in the contact path of the gravity pre-bending mold.

28. The method as claimed in claim 26, wherein the acceleration or deceleration is of at least 3000 mm/sec$^2$.

29. The method as claimed in claim 28, wherein the acceleration or deceleration is of at least 5000 mm/sec$^2$.

30. The method as claimed in claim 25, wherein the width is comprised in the range from 25 to 90 mm.

31. The method as claimed in claim 30, wherein the press-bending mold is a frame, the pneumatic raising system being an upward blowing passing through the gravity pre-bending mold and the press-bending mold during the lateral movement of the bending support positioning itself under the upper retaining form holding the sheet of glass against it.

32. The method as claimed in claim 30, wherein the width is comprised in the range from 50 to 90 mm.

33. The method as claimed in claim 22, for the relative lateral movement of the upper retaining form and/or of the bending support, and the relative lateral movement of the upper bending form and/or of the bending support, the upper retaining form and the upper bending form are given a lateral movement and the bending support is potentially fixed laterally.

* * * * *